United States Patent
Yamanaka

(10) Patent No.: US 7,159,483 B2
(45) Date of Patent: Jan. 9, 2007

(54) POWER SWITCHING SYSTEM FOR ACOUSTIC APPARATUS

(75) Inventor: Takashi Yamanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 115 days.

(21) Appl. No.: 10/927,030

(22) Filed: Aug. 27, 2004

(65) Prior Publication Data

US 2005/0044977 A1    Mar. 3, 2005

(30) Foreign Application Priority Data

Aug. 28, 2003    (JP) ............... 2003-303777

(51) Int. Cl.
*F16H 3/34* (2006.01)
(52) U.S. Cl. .............. 74/354; 74/321; 74/352
(58) Field of Classification Search .......... 74/321, 74/352, 354, 665 F, 665 GC
See application file for complete search history.

(56) References Cited

U.S. PATENT DOCUMENTS

| | | | | |
|---|---|---|---|---|
| 2,275,497 A | * | 3/1942 | Berndt | 242/340 |
| 4,760,751 A | * | 8/1988 | Kasamatsu | 74/354 |
| 5,150,630 A | * | 9/1992 | Kida et al. | 74/354 |
| 5,654,845 A | * | 8/1997 | Ohtsuki | 360/96.5 |
| 6,070,482 A | * | 6/2000 | Kugio et al. | 74/354 |

FOREIGN PATENT DOCUMENTS

JP      2000-298903      10/2000

OTHER PUBLICATIONS

Journal of Technical Disclosure publication by Japan Institute of Invention and Innovation (JIII) No. 91-7600.

* cited by examiner

*Primary Examiner*—Charles A. Marmoh
*Assistant Examiner*—David D. Le
(74) *Attorney, Agent, or Firm*—Bacon & Thomas

(57) ABSTRACT

It is sought to simplify the arrangement of the drive power switching system for an acoustic apparatus, thus permitting immediate switching of the drive power. A drive power switching system comprises driven gears always in mesh with a main drive gear located between a first and a second gear and a rocking member rotatably supporting the driven gears. The inter-axis distance between the axes of rotation of the first and second gears, is set to a length, in which the driven gears can be meshed with both the first and second gears as they are revolved together with the revolution of the rocking member.

2 Claims, 6 Drawing Sheets

POWER SWITCHING SYSTEM FOR ACOUSTIC APPARATUS

BACKGROUND OF THE INVENTION

1. Field of the Invention

This invention relates to a power switching system for an acoustic apparatus for switching the drive power transmission such that driven gears meshing with a main drive gear are selectively brought into mesh with a first or a second gear with switching of the direction of rotation of the main drive gear.

2. Description of the Prior Art

In an acoustic apparatus, the drive power transmission route from the motor is selectively switched to either a first or a second gear by switching the direction of rotation of the motor. More specifically, a main drive gear rotated by the motor is disposed between the first and second gears, the driven gear which is always in mesh with the main drive gear is supported on a rocking member, and the driven gear is caused to rock together with the rocking member according to the direction of rotation of the main drive gear, thus selectively transmitting the drive power of the main drive gear to either one of the first and second gears.

With this arrangement of the drive power switching system, the drive power of the motor can be switched to either one of the first and second gears by merely switching the direction of rotation of the motor. It is thus possible to simplify the drive power switching system. In a CD player as an example of the acoustic apparatus, as for the rotation of a pick-up drive motor the drive power is selectively switched between a pick-up drive mechanism as a first mechanism and a disk loading mechanism as a second mechanism. In a tape drive mechanism as another example of acoustic apparatus, the drive power transmission of a tape drive motor is selectively switched between pair of tape take-up reels.

In the above drive power switching systems, various attempts have been made for reliably rotating the driven gear together with the rocking member according to the direction of rotation of the main drive gear. For example, the driven gear is given a light rocking load with a spring or the like to give the rocking member a rocking force with the rotation load of the driven gear. As another example, the main drive gear is provided with a member providing slip friction, and the rocking member is given a rocking power with the rotational power of the member. As a further example, when the driven gear starts rocking together with the rocking member, the driven gear is caused to be in mesh with a stationary gear secured to a base plate.

Japanese Patent Laid-Open Publication No. 2000-298903 discloses a disc player provided with this type of drive power switching system.

Journal of Technical Disclosure published by Japan Institute of Invention and Innovation (JIII) No. 91-7600 discloses a rotation transmission switching system, in which according to the direction of rotation of a drive gear a transfer gear revolves about the drive gear to selectively switch the rotation route from the drive gear to a pair of driven gears.

With the prior art drive power switching system, for obtaining reliable rotation of the driven gear together with the rocking member, either an exclusive member for giving the driven gears or main drive gear rotational load is provided, or a stationary gear meshing with the driven gears is provided on a base plate. Therefore, the drive power switching system is complicated in construction, and also an undesired extra light rocking load is added to the drive power transfer route. Also, after the driven gears have been perfectly separated from the first gear, it is further revolved before it is brought into mesh with the second gear. Therefore, the drive power switching requires a certain interval of time.

The invention has an object of providing a drive power switching system for an acoustic apparatus, which can be simplified in construction and permits immediate drive power switching.

SUMMARY OF THE INVENTION

A drive power switching system for an acoustic apparatus according to a first aspect of the invention, features that it comprises a first mechanism operable by receiving the rotation of a first gear and a second mechanism operable by receiving the rotation of a second gear and that the inter-axis distance between a first supporting axis rotatably supporting the first gear and a second supporting axis rotatably supporting the second gear is set to a length permitting the driven gears to be meshed with both the first and second gears during rocking of the driven gears with rocking of the rocking member.

A drive power switching system according to a second aspect of the invention has an arrangement that the first mechanism prohibits the rotation of the first gear at the end of the operation, and the second mechanism prohibits the rotation of the second gear at the end of the operation.

A drive power switching system according to a third aspect of the invention has an arrangement that when the operation of the second mechanism is ended, the second mechanism holds the second gear in a rotation prohibition state.

In the drive power switching system according to the first aspect of the invention, the rotational resistance between the first and second gears can be converted to the rocking force of the rocking member. Also, since the driven gear is brought into mesh with the gear on the rocking end side with rotation in the wedging direction, the rocking member can obtain rocking force from the gear on the rocking end side. Thus, the rocking member can be given high rocking power without provision of any special member. With the provision of the two driven gears on the rocking member, it is possible to set a large inter-axis distance between the first and second supporting axes of both the first and second driven gears, and the design can be given a degree of freedom.

In the drive power switching system according to the second aspect of the invention, the rocking member can be given a rocking power based on the rotational force of the main drive gear by forcibly stopping the first and second gears at the end or terminal stage of operation.

According to the third aspect of the invention, the second gear in the rotation prohibition state is held with the dedendum directed to the addendum of the driven gears when the addendum of the driven gears are separated from the dedendum of the second gear. Thus, conversely when the addendum of the driven gear approaches the second gear, the addendum of the driven gear can be smoothly fitted in the dedendum of the second gear.

BRIEF DESCRIPTION OF THE DRAWINGS

The present invention will become more apparent upon a reading of the following detailed specification with reference to the accompanying drawings, in which.

DESCRIPTION OF THE PREFERRED EMBODIMENTS

In the drive power switching system for an acoustic apparatus according to the invention, the inter-axis distance between a first and a second gear, namely between a first and second supporting axes of both the first and second gears is set to a length permitting driven gears to be meshed with both the first and second gears during rocking of the driven gears with rocking of a rocking member.

Figure 1:
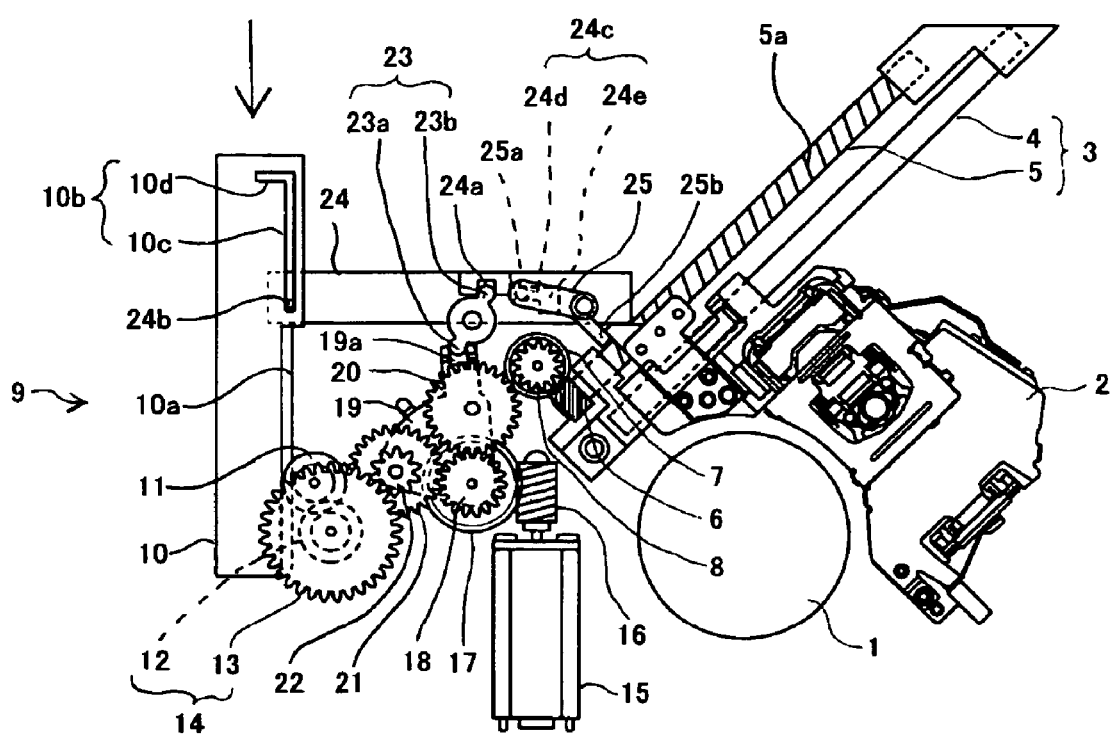
FIG. 1 is a plan view showing a drive power switching system for a disc player as an acoustic apparatus according to the invention.

Assuming now that the acoustic apparatus according to the invention is a disc player, the drive power switching device used for the apparatus will be described with reference to FIG. 1. Referring to FIG. 1, a turntable motor 1 for driving a disc is disposed on a base member (not shown) at the center thereof. A pick-up 2 for playing a disc is disposed on a base member (not shown) such that it can be automatically advanced and retreated from a position close to the turntable motor 1 towards the disk edge by a pick-up drive mechanism 3 (i.e., first mechanism). The pick-up drive mechanism 3 includes a guide shaft 4 made of metal and supporting the pick-up 2 and a helical shaft 5 mounted on the base member such as to be in the close proximity of and extend parallel to the guide shaft 4. The helical shaft 5 has a helical groove 5a formed in the outer periphery and a helical gear 6 formed at one end such as to be integral with the helical shaft 5. The helical gear 6 is in mesh with a helical gear 7 rotatably mounted on the base side. The helical gear 7 has an integral first spur gear (i.e., first gear) 8. The first gear 8 is rotatable about a first supporting axis Q.

On the pick-up 2, a spring member (not shown) is mounted for elastic engagement with the helical groove 5a. With the rotation of the helical shaft 5, the spring member causes advancement and retreat of the pick-up 2 in a stator thereof free from any play in the direction of movement. The spring member brakes the rotation of the first gear 8 through the helical shaft 5 in elastic engagement with the helical groove 5a.

A slide member 10 is disposed for advancement and retreat on one side of the base member. The slide member 10 can operate a disc clamp mechanism (not shown) and a base unlocking mechanism (i.e., first mechanism 9) for unlocking the base member. The slide member 10 has a rack 10a, which a rack gear 11 rotatably supported on the base member is in mesh with. The rack gear 11 is always in mesh with a small gear 12 of a second gear 14, which has small and large integral gears 12 and 13. The second gear 14 is mounted on the base member such as to be rotatable about a second supporting axis R. When rotation is transmitted to it, the second gear 14 causes advancement and retreat of the slide member 10 according to the direction of rotation of the second gear 14.

A main drive gear 18 is disposed between the first and second gears 8 and 14. The main drive gear 18 is formed to be integral with a worm wheel 17, which is in mesh with a worm gear 16 mounted on the shaft of a drive motor 15. As especially shown in FIG. 4, a rocking member 19 which is formed by a substantially triangular sheet material, is rotatably supported on the supporting axis P of the main drive gear 18 to be coaxial with the main drive gear 18. A first and a second driven gear 20 and 21 which are always in mesh with the main drive gear 18, are rotatably mounted on the rocking member 19. The first driven gear 20 is capable of meshing with the first gear 8 with rocking of the rocking member 19. The second driven gear 21 has an integral small gear 22, which is capable of meshing with the large gear 13 of the second gear 14 with rocking of the rocking member 19.

Figure 4:
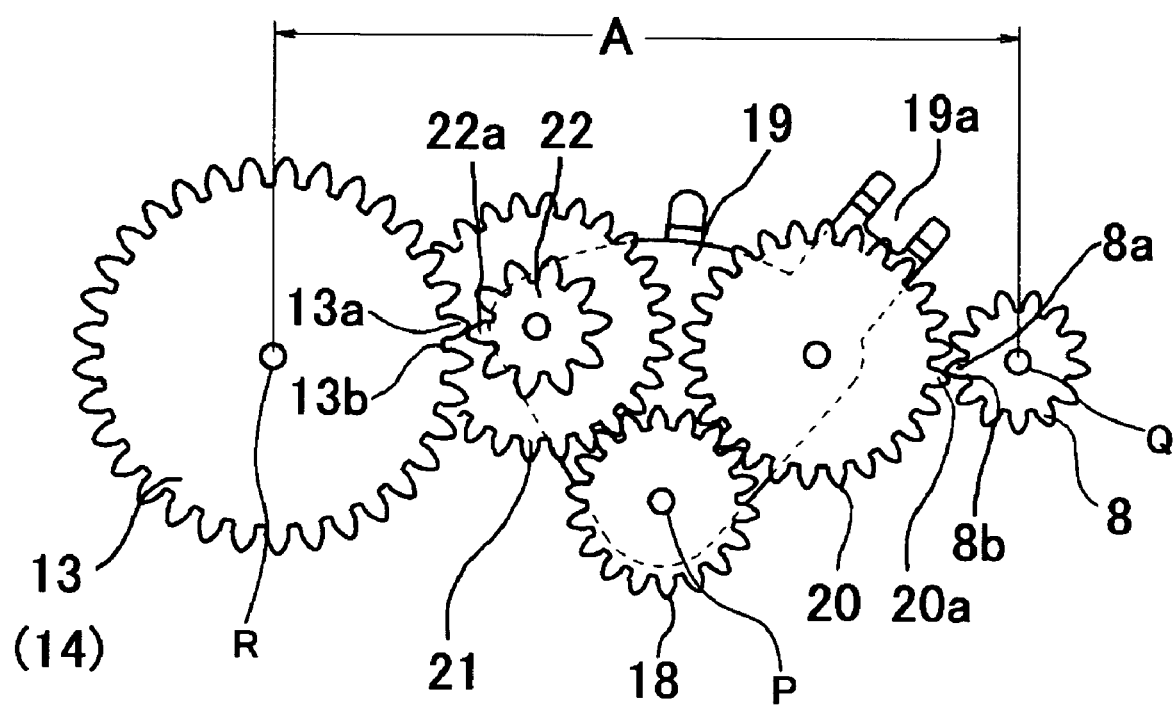
FIG. 4 is a fragmentary enlarged scale plan view showing a gear train in a state that driven gears have been brought into mesh with both the first and second gears.

As shown in FIG. 4, the inter-axis distance A between the supporting axes Q and R of the first and second gears 8 and 21, is set to a length, at which the first driven gear 20 starts to mesh with the first gear 8 when the small gear 22 is still in mesh with the large gear 13 while the first and second driven gears 20 and 21 are rocking in unison with the rocking member 19 rocking about the supporting axis P.

The rocking end of the rocking member 19 has a bifurcated extension which defines a U-shaped groove 19a. A coupling member 23 with an end part 23a fitted in the U-shaped groove 19a has a central pin rotatably mounted on the base member. The other end part 23b of the coupling member 23 is engaged in a recess 24a of an interlock member 24, which is capable of being advanced and retreated in directions perpendicular to the directions of displacement of the slide member 10. With the rocking of the rocking member 19 the interlock member 24 is advanced and retreated in a direction opposite to the direction of the rocking member 19. The interlock member 24 has a pin or shaft 24b formed at an end and capable of being engaged in an L-shaped groove 10b formed in the slide member 10. The interlock member 24 has an L-shaped hole 24c formed at the end. In the L-shaped hole 24c, is engaged a pin or shaft 25a formed on an arm 25 at an end thereof. The arm 25 has its center rotatably supported on the base member, and is biased by a spring (not shown) for rocking in the counterclockwise direction in FIG. 1. When the shaft 25a of the arm 25 is in engagement with a slot 24d in the L-shaped hole 24c and also when the other end 25b of the arm 25 is in contact with the pick-up 2, the rocking of the arm 25 by the spring in the counterclockwise direction is prohibited.

While the slide member 10 is undergoing advancement and retreat, the pin 24b of the interlock member 24 is in engagement with the long groove part 10c of the L-shaped groove 10b. When the rightward displacement of the interlock member 24 is allowed, the interlock member 24 allows the rocking of the rocking member 19 through the coupling member 23. As a result, the rocking member 19 causes rocking of the second driven gear 21 away from the second gear 14. Meanwhile, with the rightward displacement of the interlock member 24, the shaft 25a of the arm 25 reaches the end 24d of the long hole part 24d of the L-shaped hole 24c. As a result, the shaft 25a can be fitted by the spring force in the short hole part 24e of the L-shaped hole 24c. When the rocking member 19 causes rocking of the second driven gear 21 away from the second gear 14, it brings the first driven gear 20 into mesh with the first gear 8. When the rotation of the drive motor 15 is transmitted up to the helical shaft 5 with the first driven gear 20 in mesh with the first gear 8, the pick-up 2 starts displacement toward the disc edge. With the displacement of the pick-up 2, the other end 25b of the arm 25 is separated from the pick-up 2, and the arm 25 is rocked by the spring force in the counterclockwise direction, and the shaft 25a is engaged in the short hole part 24e. As a result, the displacement of the interlock member 24 by the arm 25 is prohibited. Thus, the rocking member 19 is held in the state that the first driven gear 20 and the first gear 8 are in mesh with each other.

The operation of the embodiment of the drive power switching system will now be described with reference to FIGS. 1 to 6. In the case of FIG. 1, the rotation of the drive motor 15 is transmitted from the worm gear 16 through the worm wheel 17 to the main drive gear 18 for rotating the main drive gear 18 in the clockwise direction. The rotation of the main drive gear 18 is transmitted through the small gear 22 integral with the second driven gear 21 to the second gear 14 to rotate the second gear 14 in the clockwise direction. As a result, the rotation of the second gear 14 is transmitted to the rack gear 11, which thus causes displacement of the slide member 10 in the direction of arrow in FIG. 1. With the clockwise rotation of the main drive gear 18, the rocking member 19 is given a clockwise rocking force. However, since the displacement of the interlock member 24 is prohibited by the engagement of the pin 24b of the interlock member 24 in the long groove 10c of the L-shaped groove 10b, the rocking member 19 is holding the state of rotation transmission between the second driven gear 21 and the second gear 14.

Figure 2:
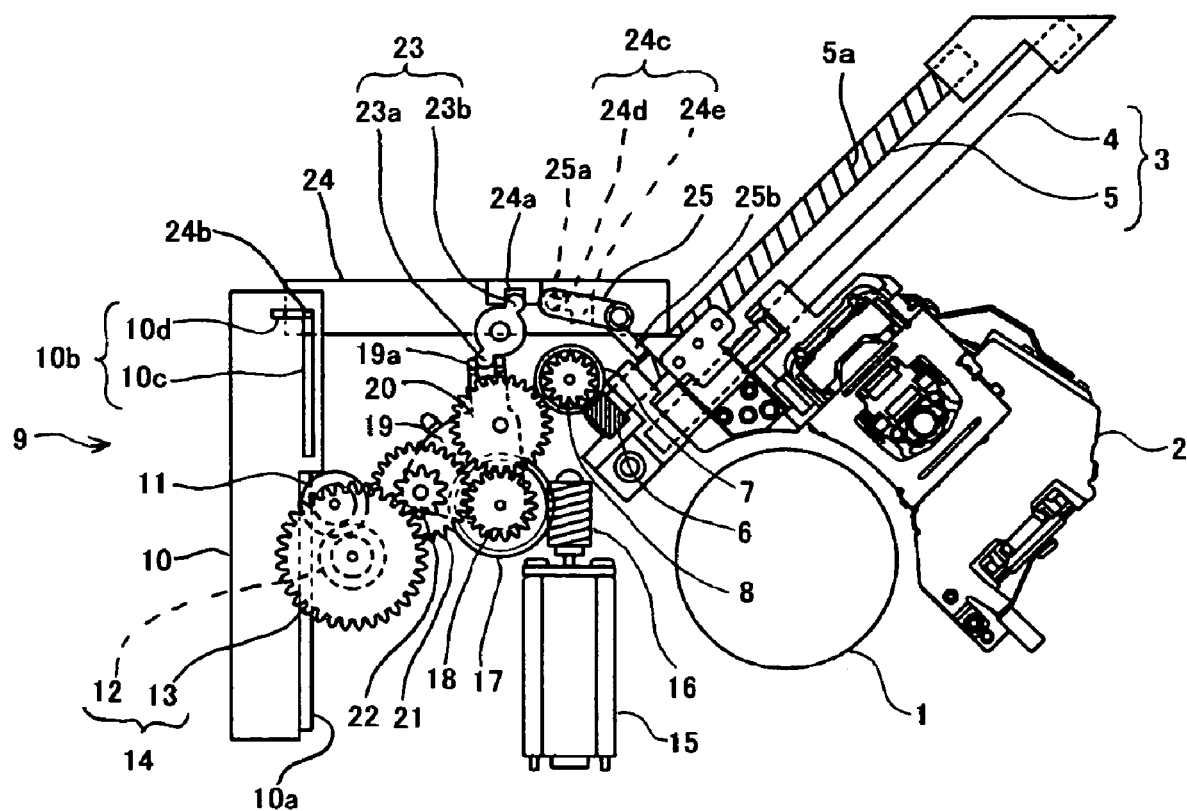
FIG. 2 is a plan view showing the drive power switching system shown in FIG. 1 in a state when the operation of a second mechanism has been ended.
Figure 3:
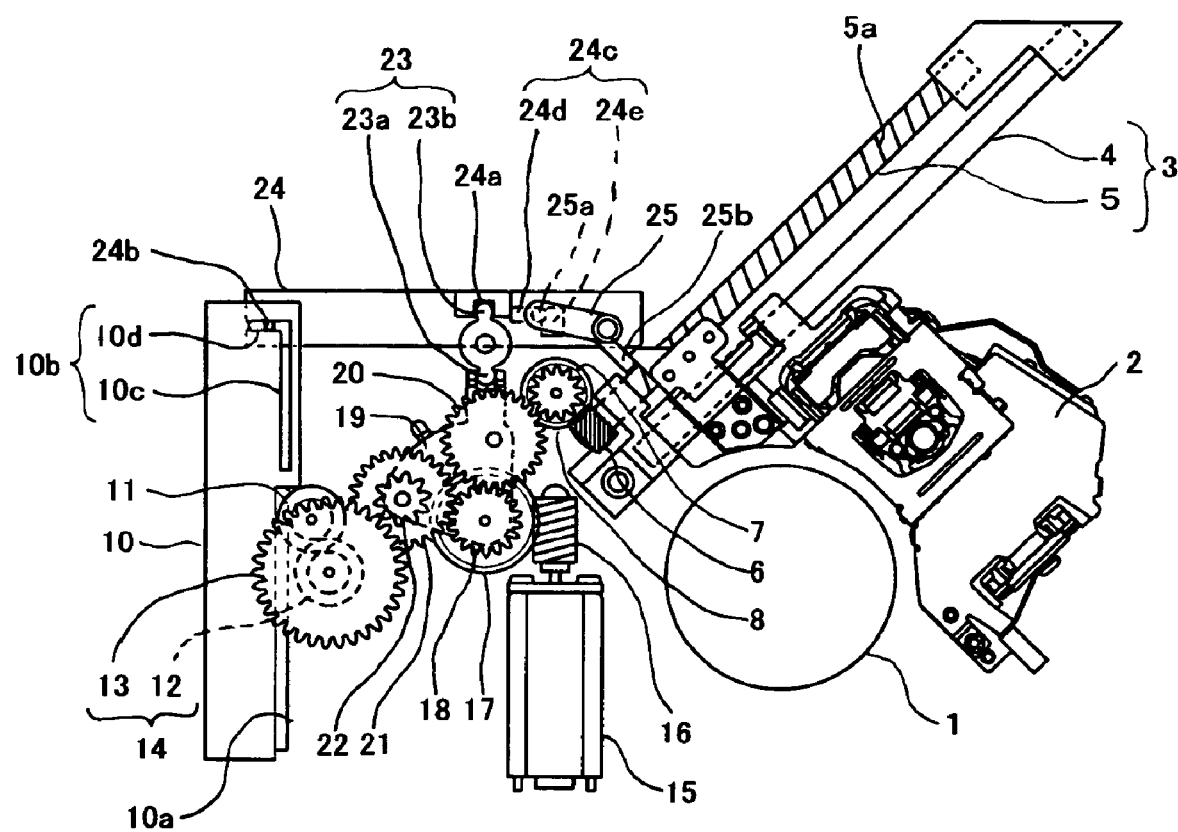
FIG. 3 is a plan view showing the drive power switching system shown in FIG. 1 in a state when driven gears have been brought into mesh with both a first and a second gear.

With the displacement of the slide member 10 in the direction of arrow, the base member is unlocked by the operation of a disc clamp mechanism and a base unlocking mechanism (not shown). As a result the disc is held on the turntable by the disc clamp mechanism (end of operation of the second mechanism 9). As shown in FIG. 2, when the slide member 10 reaches the end of displacement, the pin 24b of the interlock member 24 reaches the end of the L-shaped groove 10c, thus prohibiting further displacement of the slide member 10. With the prohibition of the displacement of the slide member 10, the drive power transmission from the rack gear 11 to the drive motor 15 is forcedly stopped. The second mechanism 9 prohibits the rotation of the second gear 14 at the end or terminal stage of the operation. As a result, the rocking member 19 is given clockwise rocking force based on the rotational power of the main drive gear 18. Since the pin 24b is engaged in the short groove part 10d of the L-shaped groove 10b, the interlock member 24 is allowed to be displaced rightward in the Figure, and the interlock member 24 allows the clockwise rocking of the rocking member 19 through the coupling member 24. With the engagement of the pin 24b in the short groove part 10d of the L-shaped groove 10b, and advancement and retreat of the slide member 10 are prohibited, and with the prohibition of the rotation of the second gear 14 (i.e., large dear 13) is also prohibited.

FIG. 4 shows, to an enlarged scale, a state, in which the rocking member 19 starts clockwise rocking about the supporting axis P. In this state, the addendum 22a of the small gear 22 and the addendum 13a of the large gear 13 are still in mesh with each other. At this time, the addendum 20a of the driven gear 20 has already started to mesh with the addendum 8a of the first gear 8. At this time, the large gear 13, the rotation of which has been prohibited, is at a rotational position that the addendum 22a of the small gear 22 faces the dedendum 13b of the large gear 13. In other words the small gear 22 is separated from the large gear 13 in a state that the addendum 22a faces the dedendum 13b of the large gear 13. Thus, opposite to this movement, when the rocking member 19 rocks counterclockwise, the addendum 22a of the small gear 22 can be smoothly brought to engagement with the dedendum 13b of the large 13.

In the meantime, since the rotation of the helical shaft 5 is braked by the spring member of the pick-up 2, the rotation of the first gear 8 is also prohibited by the mesh of the helical gears 6 and 7 with each other. The state in which the rotation of the first gear 8 is prohibited is constituted by an initial position, at which the pick-up 2 starts playback of the disc. Thus, by preliminarily setting the rotation stop position of the first gear 8 such that the addendum 20a of the first driven gear 20 approaching the first gear 8 faces the dedendum 8b of the first gear 8, the first driven gear 20 and the first gear 8 can start smooth meshing without contact of the addendums of the first driven gear 20 and the first gear 8 with each other. When the addendum 22a of the small gear 22 is separated from addendum circle of the large gear 13, the first driven gear 20 starts counterclockwise rotation. As soon as the addendum 22a of the small gear 22 is separated from the addendum circle of the large gear 13, the rotation transmission state is switched.

The counterclockwise rotation of the first driven gear 20 is rotation in the so-called wedge direction with respect to the first gear 8, and the rotational resistance of the first gear 8 acts in the direction of causing clockwise rocking of the rocking member 19.

Figure 5:
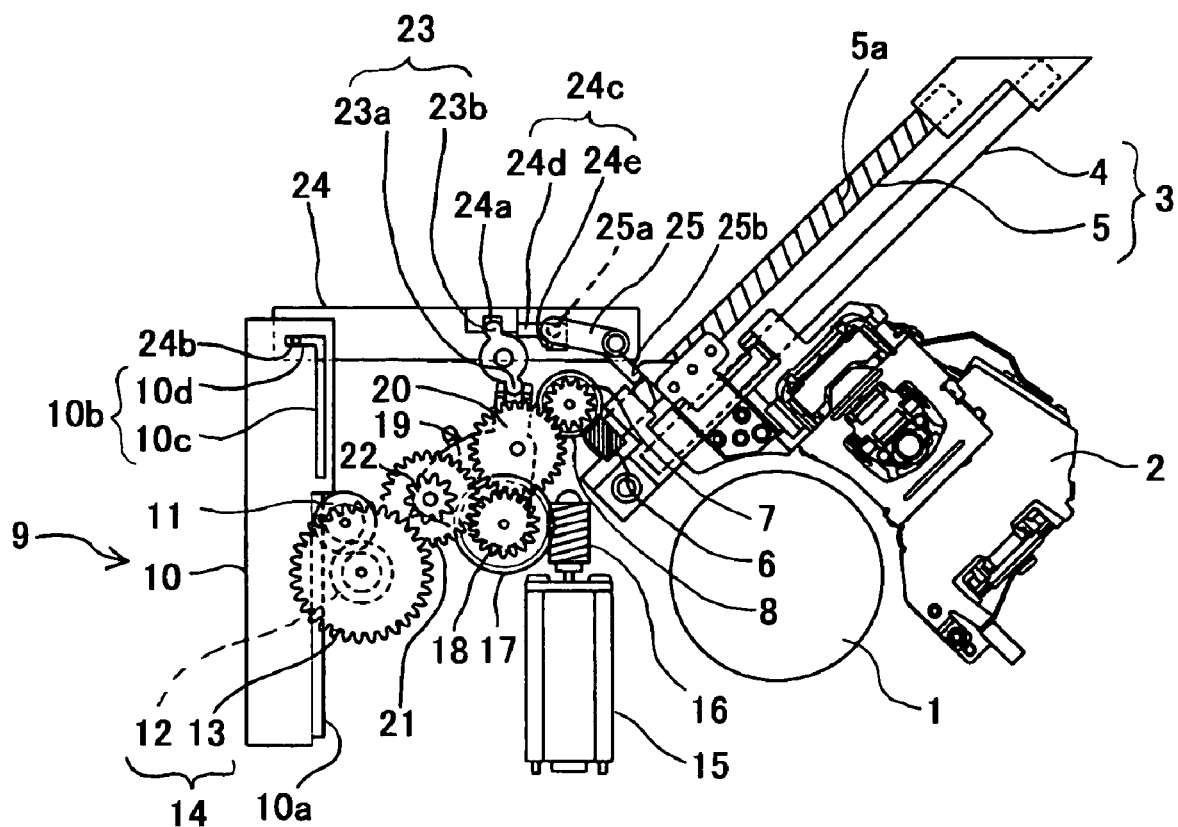
FIG. 5 is a plan view showing the drive power switching system shown in FIG. 1 in a state before the start of operation of a first mechanism.

As shown in FIG. 5, when the rocking member 19 is further revolved clockwise up to the end or final stage, the first driven gear 20 is brought to a state of regular mesh with the first gear 8. The inter-axis distance A between the axes Q and R of the first and second gears 8 and 14 is set such that the addendum circles of the small gear 22 and the large gear 13 is less than the addendum size of the gears. With the rocking of the rocking member 19, the interlock member 24 is displaced rightward, and the shaft 25a of the arm 25 faces the short hole part 24e. When the first gear 8 rotates the helical shaft 5 through the helical gears 6 and 7, the pick-up 2 is displaced away from the turntable motor 1. With the movement of the pick-up 2, the other end 25b of the arm 25 is released from contact with the pick-up 2, and as shown in FIG. 6 it is rocked counterclockwise with the spring force.

Figure 6:
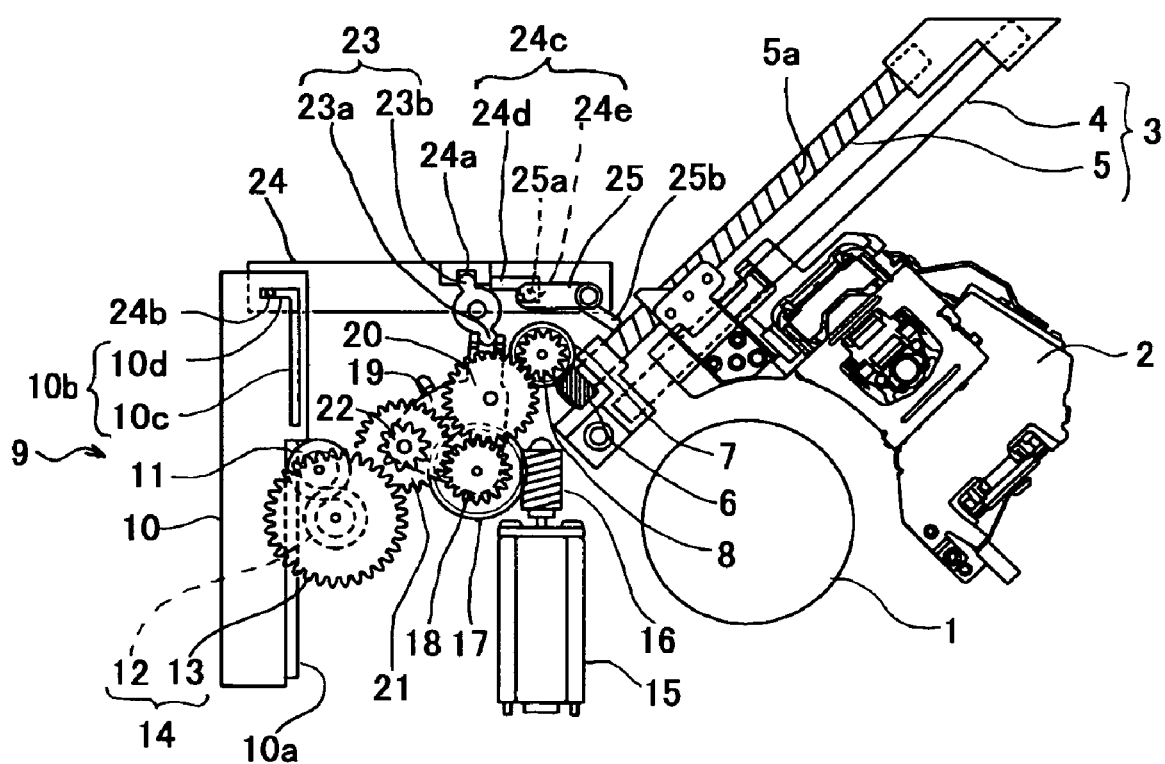
FIG. 6 is a plan view showing the drive power switching system shown in FIG. 1 in a state after the start of operation of the first mechanism.

FIG. 6 shows the state of disc playing. As shown above, when the arm 25 is rocked in the counterclockwise direction, the shaft 25a is engaged in the short hole part 24e of the L-shaped hole 24c, thus prohibiting the lateral displacement of the interlock member 24. As a result, even while the disc is played, the rocking of the rocking member 19 is prohibited, and the first driven gear 20 and the first gear 8 are held in mesh with each other. When the direction of rotation of the drive motor 15 is switched, the state of mesh is held until the pick-up 2 is restored to the initial position. When the pick-up 2 is restored to the initial position, the displacement of the pick-up 2 is forcedly stopped (end of operation of the first mechanism 3). The rotation of the helical shaft 5 at this time, is forcedly stopped by the pick-up 2. Meanwhile, the pick-up 2 disengages the shaft 25a of the arm 25 from the short hole part 24e to allow counterclockwise rocking of the rocking member 19. As a result, the rotation of the first gear 8 interlocked to the helical gear 6 of the helical shaft 5 is forcedly stopped. That is, at the end of the operation the rotation of the first gear 8 is prohibited. As a result, the rotation of the first driven gear 20 in mesh with the first gear 8 is stopped, and rocking member 19 starts to be rocked counterclockwise with the rotational force of the main drive gear 18. As shown in FIG. 4, while the addendums 8a and 20a of the first gear 8 and the first driven gear 20 are still in mesh each other, the addendum 22a of the small gear 22 is engaged with the dedendum 13b of the large gear 13, and the mesh of the small gear 22 and the large gear 13 with each other is started.

In this embodiment, the first and second mechanisms 3 and 9 are at positions spaced apart form each other, and the inter-axis distance A between the axes Q and R of the first and second gears 8 and 14 is increased, and for this reason the rocking member 19 is provided with the first and second drive gears 20 and 21. However, the arrangement of the embodiment is by no means limitative, and it is possible to use only a single driven gear so long as a short inter-axis distance can be set between the axes of rotation of the first and second gears.

When the direction of rotation of the main drive gear 18 is switched while drive power is transmitted to either one of the first and second gears 8 and 14, the driven gears cause rotation of the two gears, i.e., the first and second gears 8 and 14 operating the first and second mechanisms 3 and 9, respectively, during the rocking of the rocking member 19. In this case, the rotational resistances of the two gears act on the rocking force of the rocking member. It is thus possible to obtain the rocking force of the rocking member 19 without provision of any special member. Besides, since no light rotation load is given to the main drive gear and to the driven gears, it is possible to eliminate the rotation transmission loss.

Also, while in this embodiment, the second gear 14 and the second driven gear 21 are each formed as a two-step gear having a large and a small gear, this is by no means limitative, and it is possible to use a single-step gear as well.

In this embodiment, the drive power switching system for an acoustic apparatus according to the invention is described in its use in a disc player. However, this is by no means limitative, and the embodiment can also be utilized a drive power switching system, which is applicable to a tape take-up reel rotation switching mechanism for a video tape recorder or the like.

What is claimed is:

1. A drive power switching system for an acoustic apparatus comprising:
    a first and a second mechanism which are operated to each other selectively;
    a first gear coupled to the first mechanism and rotatable about a first supporting axis;
    a second gear coupled to the second mechanism and rotatable about a second supporting axis;
    a motor:
    a main drive gear to which the rotation of the motor is transmitted;
    driven gear means always in mesh with the main drive gear; and
    a rocking member rotatably supporting said driven gear means and rockable about an axis which is coaxial with the main drive gear, wherein:
    rotation transmission state of the main drive gear to said first or second gear through said driven gear means being switched with the rocking of said rocking member;
    an inter-axis distance between the first and second supporting axes of the first and second gears being set to a length permitting an addendum of the driven gear means to be meshed with, an addendum of both the first and second gears simultaneously; and
    when the rotation of one of the first and second gear is prohibited, the rocking member being rocked to cause the switching of the rotation transmission state soon after the addendum of the driven gear means is separated from said one of the first and second gears.

2. The drive power switching system for an acoustic apparatus according to claim 1, wherein said driven gear means comprises a first driven gear which is able to be meshed with the first gear and a second driven gear which is able to be meshed with the second gear.

* * * * *